E. Z. TAYLOR.
APPARATUS FOR MANUFACTURE OF PAPER VESSELS.
APPLICATION FILED JUNE 16, 1909.

987,928.

Patented Mar. 28, 1911.

Witnesses
R. Gorstein
M. Schmid.

Inventor
Elmer Zebley Taylor
by B. Singer
Atty

E. Z. TAYLOR.
APPARATUS FOR MANUFACTURE OF PAPER VESSELS.
APPLICATION FILED JUNE 16, 1909.

987,928.

Patented Mar. 28, 1911.

Witnesses
E. Schallinger
R. Goodstein

Inventor
Elmer Zebley Taylor
by B. Singer
Atty

E. Z. TAYLOR.
APPARATUS FOR MANUFACTURE OF PAPER VESSELS.
APPLICATION FILED JUNE 16, 1909.

987,928.

Patented Mar. 28, 1911.

Witnesses:
C. M. Crawford
E. Schallinger

Inventor:
Elmer Z Taylor
by B. Singer
Attorney

E. Z. TAYLOR.
APPARATUS FOR MANUFACTURE OF PAPER VESSELS.
APPLICATION FILED JUNE 16, 1909.

987,928.

Patented Mar. 28, 1911.

Witnesses:
C. H. Crawford
E. Schallinger

Inventor:—
Elmer Z. Taylor
by B. Singer
Attorney

UNITED STATES PATENT OFFICE.

ELMER ZEBLEY TAYLOR, OF LONDON, ENGLAND, ASSIGNOR, BY MESNE ASSIGNMENTS, TO AMERICAN MONO SERVICE COMPANY, OF ATLANTIC CITY, NEW JERSEY, A CORPORATION OF NEW JERSEY.

APPARATUS FOR MANUFACTURE OF PAPER VESSELS.

987,928. Specification of Letters Patent. Patented Mar. 28, 1911.

Application filed June 16, 1909. Serial No. 502,574.

*To all whom it may concern:*

Be it known that I, ELMER ZEBLEY TAYLOR, a citizen of the United States, residing at 40, 41, and 42 Percival street, Goswell Road, in the city of London, England, engineer, have invented certain new and useful Improvements in Apparatus for the Manufacture of Paper Vessels, of which the following is a specification.

This invention has for its object to provide a single machine by which the various operations necessary in the manufacture of paper vessels may be expeditiously and continuously performed, it only being necessary to supply such machine with blanks of the necessary forms to constitute the sides and bottoms of the vessels and to operate same by any suitable source of power.

The vessels for the manufacture of which the machine is particularly intended are usually of conical form, tapering slightly from the top downward and having a bottom secured therein, and are more especially intended for use in the delivery of milk or cream to customers and to be destroyed after being once used, so that it is necessary to reduce the cost of manufacture thereof as much as possible, and it is for this purpose that the present machine, by which all the necessary operations can be efficiently and economically carried out at a high speed, has been devised.

The invention will now be described in connection with the accompanying drawings, which illustrate a suitable form thereof, but it is to be understood that such invention is not confined to such form either of the complete machine or of the various mechanisms for carrying out the different operations. It must also be understood that claim is not laid to any particular form of the various co-acting mechanisms hereinafter referred to, the invention consisting in the combination rather than in the individual construction or arrangement of the different elements employed.

In the accompanying drawings.

Figures 2, 3:
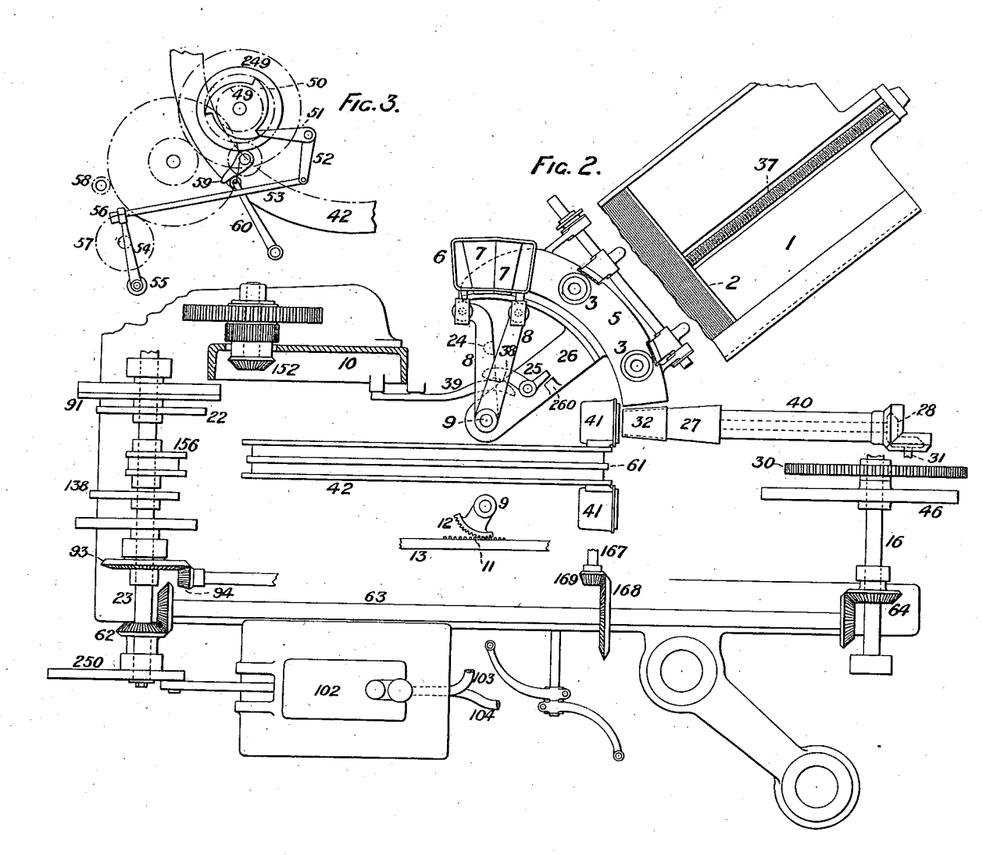
Fig. 2 is a plan view with parts in section and other parts removed to illustrate devices omitted from or not clearly shown in Fig. 1.
Fig. 3 is a view illustrating the method of intermittently driving and spacing the carrier hereinafter described.
Figure 4:
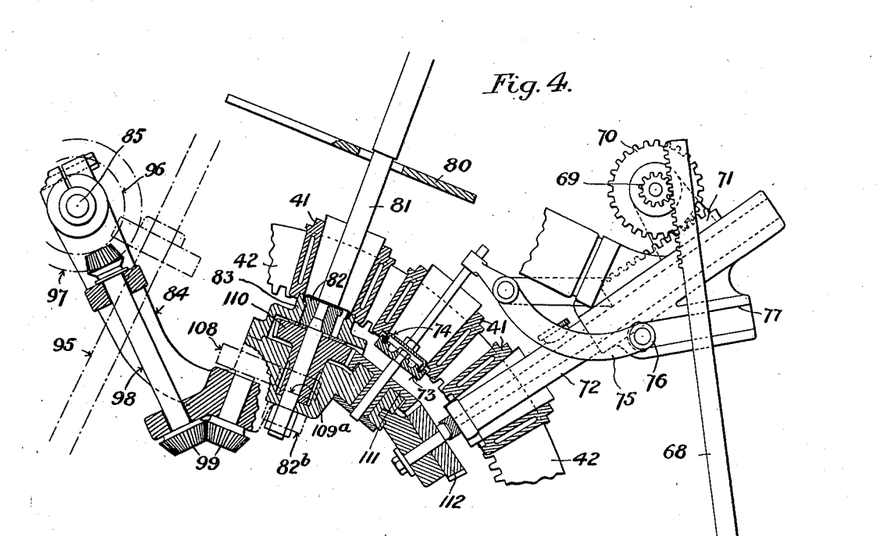
Fig. 4 is a sectional view on a larger scale showing the bottom pasting, turning in and rolling out appliances and the mechanism connected therewith.
Figures 5, 6:
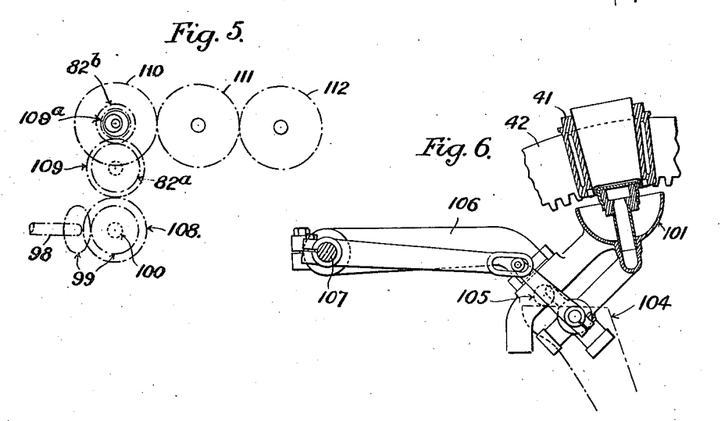
Fig. 5 is a diagrammatic view of the gearing employed in connection with these mechanisms.
Fig. 6 is a sectional view of the mechanism for waxing the outer surface of the vessel.
Figure 7:
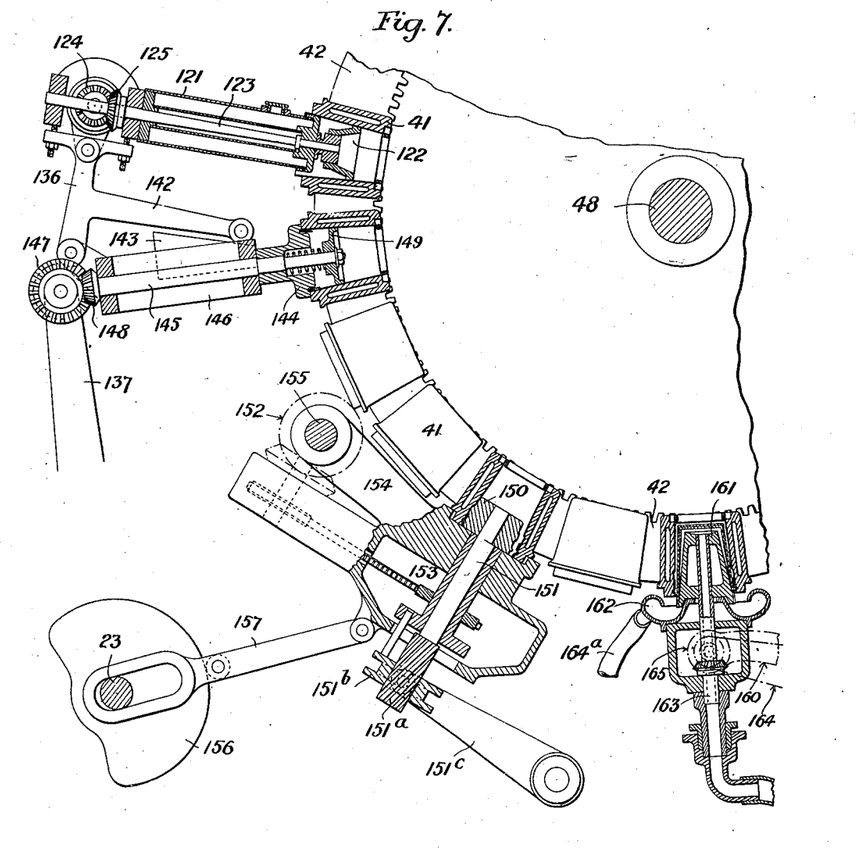
Fig. 7 is a view showing the top pasting, turning in and rolling out mechanisms, and the mechanism for waxing the inner surface of the vessel.

In the following description a single device only for carrying out each of the different operations is described, but in the preferred construction of machine such devices are duplicated on each side of the carrier employed, which in this case is as shown in Fig. 2 provided on each side with pockets to receive the vessels and convey them to the different mechanisms for acting thereon.

The various operations to be carried out and suitable forms of apparatus will now be described.

*Mechanism for feeding in and pasting blanks.*—The blanks are contained in a holder 1 provided with a pusher 2 to normally keep the series pressed toward the delivery end thereof. On the machine a pair of suckers 3 is pivoted, these being capable of turning to bring their operating faces from the horizontal position shown in Fig. 2 upward against the foremost blank of the series contained in holder 1, and when in this position a connection with an exhaust blower is opened so that such foremost blank is caused to adhere to such suckers, which then return to their horizontal position taking the blank with them. When such blank has been deposited on the pasting board 5 the mechanism for applying paste or the like commences to operate. This mechanism comprises a paste box 6 the bottom of which is closed by a pair of conical rollers 7 mounted therein and the surfaces of which project therethrough. This pasting box 6 is carried by arms 8 pivoted at 9 in a bracket on the frame 10 of the machine, and has a reciprocating movement imparted to it by means of a rack 11 and sector 12, such rack being operated by crank arms or levers 13 and 14 from cam 15 mounted on shaft 16. It will be seen that on the rotation of shaft 16 the arms or levers will move the rack 11 and thereby rotate the sector 12 and thus move the arms 8, carrying the paste box 6, toward the center line of the machine, so that such paste box will thus be carried over the blank on pasting board 5 and by means of its rollers 7 paste sufficient of the length of such blank to cause the latter to keep its shape when rolled up as hereinafter described. As soon as sufficient of the length of the blank has been pasted the paste box is lifted from contact with the blank, which may be effected by means of the lever 17 acting on its pivot 9 and operated by means of crank 18, connecting rod 19, crank 20 and lever 21 from cam 22 mounted on shaft 23. The arms 8 on which paste box 6 is mounted continue their movement after such paste box has been lifted from contact with the blank, and a projection 24 on one thereof comes in contact with one arm of a catch 25 mounted on lever 26 which carries the pasting board 5. At this point the connection with the suction pump is broken by a suitable cam and valve, and further movement of projection 24 on arm 8 carries pasting board 5 forward by means of stop 260, thus feeding the blank to the means employed for rolling the latter into shape.

Figure 8:
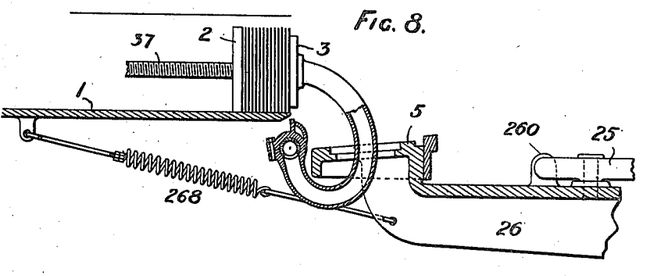
Fig. 8 is a sectional view of the pasting board showing the suckers in the operation of taking a blank from the holders.

It will be seen that the pasting board 5 is of segmental form and has a sloping upper surface corresponding with the incline of the under surface of the mandrel 27. Through the pasting board are holes permitting of the movement of the suckers 3, and the board itself is carried by a lever 26 pivoted at 9, on which it can turn to bring the forward edge of the board into close proximity to the mandrel 27. This movement of the pasting board is effected by paste box arm 8 as described, and the return movement thereof may be effected by a spring such as that shown at 268 in Fig. 8, the opposite ends of which are respectively connected to the under side of the blank holder 1 and the pasting board 5.

*Mechanism for rolling blanks.*—This comprises a mandrel or former 27 of conical form and preferably collapsible, and which is adapted to be continuously rotated by bevel gearing 28 by means of chain wheels 29 and 30 mounted respectively on the shafts 31 and 16. The inner end of the mandrel or former is partially surrounded by a sheath 32, sufficient space being left between such mandrel and the sheath to permit the blank to enter and lie around the mandrel, the object of providing such sheath being to cause the blank to follow the form of the mandrel instead of remaining flat as would otherwise normally be the case. Below the mandrel a supporting roller 33, also of conical form, is mounted, same being free to rotate and being carried by arms mounted on a spindle 34 which is normally kept in its raised position by means of a weight 35 carried by a lever 36 suitably connected to such spindle. When the pasted blank is carried forward as previously described its forward end is gripped between the mandrel 27 and roller 33, and it is then, by the rotary movement imparted to such mandrel, drawn away from the pasting board and rolled up into the desired shape, the mandrel 27, free roller 33 below same, and sheath 32 surrounding the mandrel all coöperating to effect this object. The blank is usually of such length that the sides of the vessel will be formed of a double thickness of the material employed, and in this case the pasting operation will preferably cover about half of the blank with paste, and this pasted portion will by the rolling operation described be brought into contact with the unpasted part and caused to adhere thereto.

Figure 9:
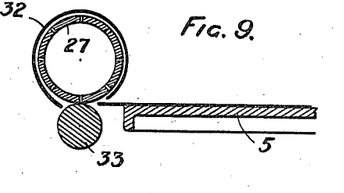
Fig. 9 is a cross sectional view of the mandrel and its sheath.

As will be seen by reference to Fig. 9, the sheath 32 surrounds the mandrel 27, almost completely, its open portions being so disposed that after the forward edge of the blank has passed between the mandrel 27 and the supporting roller 33 it will come in contact with a portion of sheath 32 lying at such an angle as to deflect it from a straight path and cause it to wrap itself around the mandrel during the continued rotation of the latter. The sheath is formed of light flexible metal and guides the blank so far around the mandrel that its forward edge will again enter between the mandrel and supporting roller to admit of the pasted outer ply of material being wound around the unpasted inner ply. The sheath 32 is supported in any suitable manner so that it does not move forward with the mandrel when the latter advances to deliver the rolled blank into one of the pockets 41 of the carrier 42, such sheath being as above stated of flexible material so that it will simply be extended by the larger end of the conical mandrel and resume its normal position around the smaller end of the latter when the parts return to the position for receiving a fresh blank.

When the pasting board 5 has delivered the pasted blank to the mandrel 27, the former will return to its original position ready to receive another blank, this return movement being preferably utilized to operate by any suitable means the screw 37 by which the pusher 2 for moving the series of blanks forward is actuated. On the completion of the return movement of the pasting board lever 26 the trip 25 will engage the notch 38 in lever 39 and the parts will be brought to rest in position for a further operation.

Figure 1:
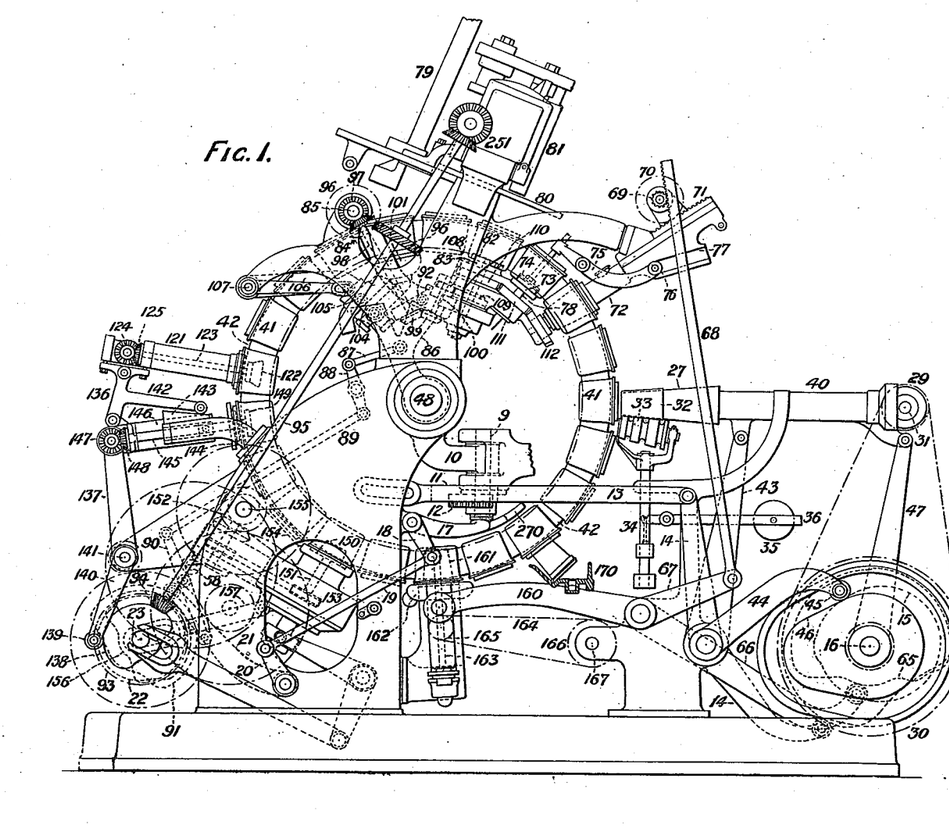
—Figure 1 is a side elevation of the machine, some parts being omitted.

When the rolling of the blank has been completed, the sleeve 40 in which the mandrel spindle is rotatably mounted is caused to advance and carry the rolled up blank into one of a series of pockets 41 mounted on a rotating carrier 42, the sheath 32 and roller 33 which do not partake in this advance movement yielding, the former by reason of its springiness and the latter against the influence of weight 35, to permit the larger part of the conical mandrel to pass. Such advance movement and the subsequent return can be conveniently effected by means of the lever 43, crank 44 and roller 45 operated by cam 46 mounted on shaft 16. In order that the mandrel 27 may deliver the rolled blank centrally into the pocket 41 which is in position to receive it, the rear end of its sleeve 40 is preferably supported by a lever 47 mounted parallel with and partaking of the movement imparted to lever 43, and which may as shown in Fig. 1 be pivoted on shaft 16.

As hereinbefore stated the mandrel 27 is preferably made collapsible, in which case it may be arranged to remain slightly expanded in diameter during the operation of rolling up the blank, and to be slightly contracted at the moment it has brought the rolled blank into position in pocket 41, thus facilitating the release of such blank therefrom.

Figure 10:
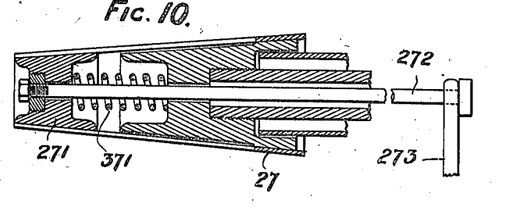
Fig. 10 is a longitudinal sectional view thereof.
Figure 11:
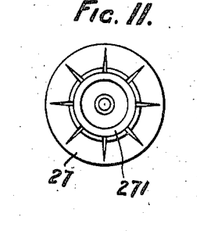
Fig. 11 is an end elevation of the structure shown in Fig. 10.
Figure 12:
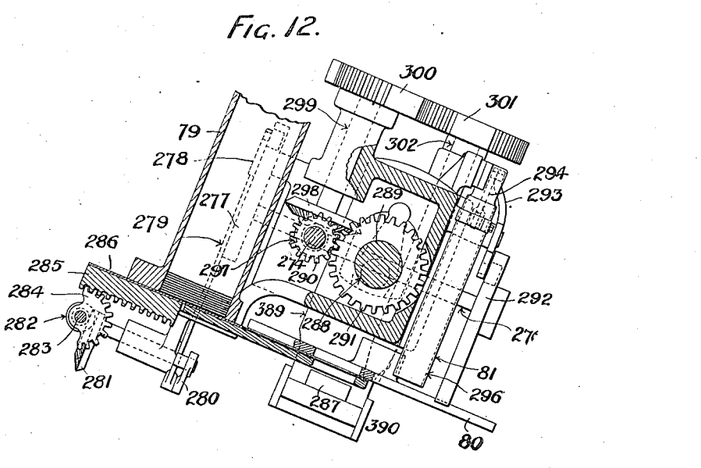
Fig. 12 is a sectional view of the mechanism for shaping the bottoms.

In Figs. 10 and 11, it will be seen that the mandrel is split from its smaller end for the greater portion of its length and that a head 271 is arranged within such smaller end, being forced toward such end by spring 371. This head is of such dimensions that when it is advanced to its foremost position in such mandrel it will expand the latter to the proper diameter for the rolling of the blank, but such head is capable of movement (which may be imparted thereto by a rod 272 the opposite end of which is acted on by an arm or lever 273 operated by a cam or otherwise from shaft 16), so that when the mandrel has been advanced to deliver the rolled blank to the pocket 41 the head will be withdrawn farther into the mandrel permitting the latter to spring back to its smaller normal diameter and thus releasing the rolled blank therefrom.

*The carrier and driving mechanism.*—The carrier may as shown consist of a wheel 42 mounted on central shaft 48 and adapted to be intermittently rotated, each movement being just sufficient to bring the next pocket 41 after the one in which a rolled blank has been inserted into position opposite the mandrel 27 to receive the following rolled blank. The intermittent movement and the correct positioning of the wheel 42 and pockets 41 may be effected in any suitable manner, as for example that shown in Fig. 3, in which it will be seen that the wheel 42 is internally toothed, and a pinion 49 gears with such teeth. On the shaft of pinion 49 a friction clutch 249 is mounted by which motion is communicated to the carrier, and a ratchet 50 is also secured thereon in conjunction with which a catch 51 operates. An arm 52 on the pivot of catch 51 is connected by a rod 53 to another arm 54 pivoted at 55, and the outer end of which starts the machine by entering the path of a projection 56 on wheel 57 which is driven from the motor shaft 58. When wheel 57 in rotating brings projection 56 into contact with arm 54, catch 51 releases the ratchet wheel 50 and permits the outer part of the friction clutch 249 to rotate the inner part thereof, which is mounted on the shaft of pinion 49 and therefore drives wheel 42. On the frame is pivoted a cam 59 which is driven from the shaft of pinion 49 and toward the end of each movement of wheel 42 comes in contact with and depresses an arm 60 connected with band brake 61 passing around the periphery of wheel 42, and thus puts on the brake so as to bring the machine to a gradual stop at the end of each intermittent movement.

The motion of the motor shaft is communicated to cross shaft 23 and from thence by bevel gearing 62 to longitudinal shaft 63, which at the other end of the machine drives cross shaft 16 by means of bevel gearing 64. On the cross shafts 23 and 16 most of the cams hereinbefore and hereinafter referred to for operating the different parts of the entire machine are mounted, but it must be understood that the invention is not confined to this particular arrangement of driving mechanism, as any other suitable arrangement may be adopted.

Immediately the mandrel 27 has inserted the rolled blank into the pocket 41 which was in position to receive it, such mandrel is returned to its rearward position by means of the cam 46, and the carrier 42 then operates to bring the next pocket into position. In the arrangement illustrated in the drawings the complete rotation of the carrier is effected in twenty-one steps, and in the subsequent description of the different operations to be effected in the manufacture and delivery of the vessel such operations will be referred to as taking place at the first, second, etc., positions, that at which the rolled blank is delivered by the mandrel into one of the pockets being the first. As (including such delivery) there are ten different operations to be performed, it will be seen that at certain of the stopping positions nothing is done, this being for the purpose of permitting of the drying of the paste, etc., employed, with the object of facilitating which the pockets are kept in a heated state by means of steam or other medium, which is caused to circulate through the hollow sides of such pockets.

*Pasting mechanism for bottom of vessel.*— At the third position the rolled blank has paste or the like applied to the inner surface of its lower end for the purpose of causing it to firmly hold the bottom piece which is to be subsequently inserted. This pasting is effected by suitable mechanism which is advanced into the rolled blank immediately same arrives in position by means of the cam 65 which operates levers 66 and 67, the latter having a connecting rod 68 pivoted thereto. The upper end of such connecting rod 68 is provided with a rack and engages a pinion 69 on the shaft of which is a spur gear 70 engaging a rack 71 connected to the pasting mechanism, so that in the operation of the machine such mechanism will be alternately advanced and retracted. The pasting mechanism itself may comprise a tubular reservoir 72 the operating end of which is perforated and may be covered with a layer of felt, flannel or other suitable material which will be kept moist by the paste issuing through the perforations, and impart sufficient of such paste to the lower part of the inner surface of the rolled blank to cause the bottom piece which is to be subsequently inserted to adhere thereto. When this has been effected the pasting mechanism is withdrawn to permit carrier 42 to advance another step to the fourth position. In its advanced position the reservoir 72 preferably comes into contact with an eccentric bush the throw of which is adjustable, such bush being continuously rotated by means of the gearing hereinafter described and being so arranged that as it advances to meet the reservoir 72 it is rotating circularly, but after it has made contact therewith its motion becomes eccentric, whereby it carries the reservoir around in contact with the whole of the lower part of the inner surface of the vessel being operated on.

The eccentric motion by which the bottom pasting mechanism is brought into operation is obtained by providing the spindle on which gear 112, hereinafter referred to, is mounted with an eccentric end portion which as the spindle is advanced enters a conical recess formed in the end of the spindle of the pasting mechanism. This spindle is of small diameter so that it can spring slightly sidewise under the influence of the eccentric portion of the spindle of gear 112, and the paster 72 is thereby brought into contact with the side of the vessel, around which it rolls eccentrically as such gear 112 is rotated, returning however to its normal central position on the completion of the operation on each vessel.

*Mechanism for turning in bottom of vessel.*—In the fourth position of the carrier the lower edge of the vessel being formed is turned in, for the purpose of effecting which object a rotating crimper 73 may be employed and operate in conjunction with a former 74 which at the required times is advanced into the vessel, into the lower part of which it fits. The former 74 consists of a shallow cup the edges of which are of approximately the same thickness as that of the material employed for the vessels, and its advance and withdrawal may be effected by mounting same so as to be carried backward and forward with the pasting mechanism just described in any suitable manner, the lever 75 carrying same being caused to turn in relation to such pasting mechanism by its roller 76 engaging in inclined groove 77 in the pasting mechanism bracket, so as to cause the withdrawal of the former 74 in the axial line of the pocket 41 in connection with which it operates.

The crimper in conjunction with which the former 74 operates is mounted on a spindle 76 rotated by suitable gearing which will be more specifically hereinafter referred to, such crimper comprising a disk in the face of which a circular groove is cut into which the lower edge of the rolled blank enters. The former 74, which as stated fits into the lower edge of the vessel, also enters the groove in crimper disk 73 but not so far as such lower edge, and the effect of the rotary movement of the disk 73 will be that the material of the vessel will be turned up inwardly into contact with the inner edge of the sides of the cup or former, so that when the latter is withdrawn on the completion of this operation a space will be left between the sides of the vessel and the turned up edge into which the flange of the bottom piece can be inserted.

Figure 13:
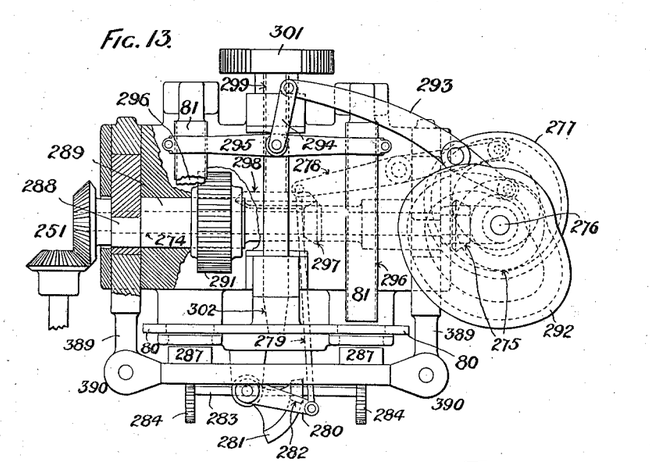
Fig. 13 is a plan view thereof.

The gearing 251 shown in Figs. 1 and 13 operates a spindle 274 from which all the movements necessary in the mechanism are obtained. Such spindle 274 by gears 275 drives a cam shaft 276, on which a cam 277 is mounted which is employed to actuate the means for taking a disk from receptacles 79, such cam operating lever 278, connecting rod 279, lever 280, sector 281, and bevel gear 282 mounted on shaft 283. On the latter are mounted sectors 284 gearing with movable racks 285 each connected to the lower side of a sliding plate 286, which is thus caused to reciprocate beneath receptacle 79 and in its forward movement to engage the lowermost disk therein and push it forward. This advances a disk previously taken from the receptacle into position beneath one of the apertures in the plate 80

(which is at this time stationary) and above a punch 287 capable of being raised and lowered by means of eccentric pins 288 on a spindle 289 receiving motion from shaft 274 by gear wheels 290 and 291. The eccentric pins are at each end of spindle 289 and engage slides 389 the lower ends of which support the die carrying frame 390. When the paper disk has been positioned as described, the punch 287 commences to rise and engaging the paper disk, forces it upward into the aperture in plate 80, such aperture being of such size in relation to the die as to allow for the thickness of the paper. By these means a downwardly depending flange is formed on the paper disk, which remains in the aperture in plate 80 until in the intermittent rotary movement imparted to the latter such aperture is brought beneath the plunger 81. This plunger has a vertical reciprocating movement imparted to it by means of cam 292 mounted on shaft 276, lever 293, connecting link 294 and cross bar 295, the latter being suitably connected to the two plungers so as to cause them to operate simultaneously. Each plunger consists of a tube or cylinder closely surrounding a stationary piston 296, the effect of this construction being that as the plunger moves downward it will come in contact with the formed up paper disk in plate 80, and as this will close its open lower end a vacuum will on the continued movement be formed within such plunger which will hold the paper disk on the end thereof until the same has been placed and rolled in position within the vessel being made, when on the return movement of the plunger the vacuum will be broken. The intermittent rotary movement of the plate 80 may be effected by the means shown, comprising a bevel gear 297 on a spindle 274, a bevel wheel 298 gearing therewith and mounted on a spindle 299 the upper end of which carries a gear 300 having teeth at only one part of its periphery, and a gear 301 with alternate sets of teeth and blank spaces. The teeth and blank spaces of gears 300 and 301 are so calculated and arranged that gear 300 will impart the desired movement to gear 301, the spindle 302 of which has mounted thereon a plate 80, and then gear 301 will stop while gear 300 completes its revolution and thereby brings its one set of teeth into engagement with the next set of teeth of gear 301, to impart a further movement to the latter and plate 80.

*Mechanism for inserting blank and rolling bottom.*—The bottom piece is inserted when the pockets of the carrier 41 arrive at their fifth position. A series of such bottom pieces in the form of flat disks of the material employed is contained in a receptacle 79 and the lowermost of the series is taken therefrom by suitable means and delivered to a die to which a reciprocating movement is imparted and which forms a downwardly extending flange on such disk of material. By this operation the bottom piece is positioned in one of a series of apertures in a plate 80 to which an intermittent rotary movement is imparted, and which conveys it into the axial line of the pocket in which the rolled blank with its lower edge pasted and turned up ready to receive it is situated. When in this position a pneumatically operating plunger 81 descends into contact with the bottom piece and by the suction thereby formed grips such bottom piece, and in its continued movement the plunger carries the latter down with it into the partially completed vessel and places it in position in the latter, the turned up lower edge of which incloses the flange of the bottom piece. The plunger 81 holds the bottom piece in position while a rolling apparatus comes into operation and rolls the lower edge of the vessel and the flange of the bottom piece into close contact and causes them to adhere firmly together. The die for forming up the bottom piece, the intermittently rotating plate 80 in which such bottom piece is positioned, and the plunger 81 by which the formed bottom piece is inserted in the vessel, may be operated by means of bevel gearing 251 from shaft 95, operated as hereinafter described from shaft 23.

The rolling apparatus comprises an eccentrically mounted roller 82 having a conical operating surface and working in an opening also of conical form in a part 83 which is advanced to enter an annular recess in the inner end of the pocket and so surround the outside of the lower edge of the vessel, carrying with it the eccentrically mounted roller, which enters the vessel below the bottom piece and in operation is caused to roll around the entire circumference of the inner surface of the vessel below such bottom, and in so doing to press the outer surface of such vessel into contact with the conical opening in part 83 in which it works, thus causing the pasted inner surfaces of the side of the vessel and of the upturned edge thereof to firmly adhere to the flange of the bottom piece which has been introduced between them.

The parts of the pasting, crimping and rolling mechanisms just described situated on the inner side of the circumference of carrier 42 are mounted on an arm 84 pivoted at 85 on the frame of the machine, and are advanced to and retracted from their operative positions by means of a cam 86 mounted on the hub of the carrier. Such cam 86 is operated by means of connecting rod 87, lever 88, connecting rod 89, and lever 90 through cam 91 mounted on shaft 23, and acts on a roller 92 carried by arm 84. The necessary rotary movement is imparted to such pasting, crimping and rolling mechanisms from shaft 23 in the following manner:—On such shaft is a bevel wheel 93 gearing with bevel wheel 94 on shaft 95, from which latter motion is communicated by helical gears 96 and bevel gearing 97 to shaft 98. This in turn transmits its movement by bevel gears 99 to shaft 100, having gear wheel 106 mounted thereon engaging with gear wheel 109, the latter operating the spindle of the rolling mechanism and through the train of gears 110, 111 and 112 the rotating parts of the crimping and pasting mechanisms.

The eccentric motion by which the rolling head 82 is brought into operation is obtained by the following means:—Such head 82 is mounted on a spindle the end of which carrying such head is eccentric in relation to the main part thereof, such spindle being continuously rotated by a gear wheel 82$^a$ and a pinion 82$^b$ from spindle 100. The rolling head spindle is mounted in a sleeve having an eccentric bore, such sleeve being also continuously rotated by means of a gear wheel 109 mounted on the same spindle as gear wheel 82$^a$, and engaging with a pinion 109$^a$ on the sleeve. The gear wheels 82$^a$ and 109 are of slightly different sizes, so that in operation the rolling head spindle and the sleeve in which it is mounted will be rotated at slightly different speeds, whereby the eccentric portions of the spindle and sleeve will be caused to gradually change their relative positions, these changes being so timed that when the rolling head is being advanced to its operative position the eccentric portions counteract each other so that such head is centrally disposed in relation to the vessel on which it is to operate, the change then begins to take place until the eccentric portions carry the rolling head into contact with the vessel to effect the rolling, and then gradually the rolling head returns toward its central position and the rolling apparatus is withdrawn from the vessel.

The gear 110 is mounted on the sleeve carrying the rolling head spindle, and transmits the movement imparted to it from such sleeve to the gears 111 and 112 operating the crimping and pasting mechanisms.

*Mechanism for waxing bottom of vessel.*—In the seventh position of the carrier 42 the outer side of the lower part of the vessel being formed, which now has its bottom piece secured therein, is treated with paraffin wax or other suitable material, which has the effect both of assisting in keeping the parts in position and of rendering the lower edge waterproof. This operation is effected by means of a cup 101 to which the material is supplied in liquid form, and which is advanced to surround the lower end of the vessel.

When waxing cup 101 has been advanced to its operative position a connection with a pump 102 is opened, and as such pump is then by means of flexible tubing 103 in direct communication with the waxing cup 101 the material in the latter is squirted up into contact with the vessel being formed, and on the return stroke of the pump any surplus of the material is drawn back into the cup and so to the reservoir.

The advance and subsequent withdrawal of the waxing cup to and from its operative position may be effected by means of a cam 104 connected with and consequently operated by the same means as hereinbefore described in connection with the advance and withdrawal of the arm 84 carrying the rolling and crimping mechanism, such cam 104 acting on a roller 105 connected with the waxing mechanism and so causing the lever 106 carrying the latter to turn on its pivot 107.

After the waxing of the lower part of the vessel has been effected as just described, and which as stated takes place at the seventh position of the carrier, the latter may as in the arrangement illustrated move to its eighth, ninth and tenth positions without any further operations being carried out on the vessel, thereby giving the paste which has been applied to the latter time to dry under the influence of the heat, while during this time also any surplus of the paraffin wax will be absorbed.

*Mechanism for pasting upper edge of vessel.*—At the eleventh position means are provided for applying paste or the like to the inner surface of the upper edge of the vessel, so as to cause the parts to adhere when such upper edge is subsequently turned inwardly for the purpose of strengthening it and improving its appearance. The pasting apparatus comprises a font or tubular reservoir 121 having a rotating spindle 123 passing therethrough, such spindle carrying at its forward end a conical head 122 which when the apparatus is advanced to its operative position engages the inner surface of the vessel. This engagement and the consequent tendency of the head 122 to remain stationary instead of revolving with spindle 123, is utilized to bring into action an eccentric bushing supporting the forward end of paste font 121, such forward end being thereby caused to rock eccentrically and roll around the inner surface of the upper edge of the vessel, and as such forward end is perforated and covered with felt or the like such inner surface will thus be evenly pasted all around.

The rotary movement of the spindle of the pasting mechanism is communicated thereto by bevel gears 124 and 125 receiving motion from shaft 23 by means of a chain wheel mounted thereon and communicating its motion to the shaft on which bevel pinion 147 hereinafter referred to is mounted, the motion of which is in turn transmitted to the spindle of the pasting mechanism by a chain and chain wheels.

The lever 136 on which the pasting mechanism is mounted has a reciprocating or backward and forward movement imparted to it through lever 137 by means of cam 138 mounted on shaft 23, and with which engages a roller 139 carried by a lever 140 pivoted at 141 on the frame of the machine to the same pivot as lever 137, which it therefore turns with it.

In order that the paste font 121 may be advanced and retracted in the axial line of the pockets 41 when the latter are in the position in which such paste font is to operate, the lever 136 carrying same is provided with an arm 142 the roller of which bears on an inclined surface 143 secured to the frame of the machine. It will be seen that when the paste font is being withdrawn from the position shown in Fig. 1 the roller on arm 142 will ride up the inclined plane 143 and thereby cause the raising of the forward or operating end of the paste font and its consequent withdrawal without damaging the vessel.

*Mechanism for turning in upper edge.—* On this movement being completed the carrier moves another step forward, bringing the vessel to the twelfth position, where its upper edge is to be turned in preparatory to being subsequently rolled out to the desired form. The turning in is effected by means of the head 144 mounted on spindle 145, the latter rotating in a frame 146 which is advanced by the same means as that previously described for the top pasting mechanism, the lever 136 on which the latter is mounted being pivoted to such frame 146, which in its turn is pivoted to the lever 137. Rotary movement is imparted to spindle 145 carrying the crimping head 144 by means of bevel gears 147 and 148 by chain gearing from shaft 23 as previously described, and such spindle also carries at its forward end a cone plate 149 which enters and fits the vessel and thereby insures the correct positioning of the crimping head. The forward face of the latter is formed with a groove of semi-circular section, into which the upper edge of the vessel enters as the crimping head is advanced, rollers having a circumferential groove of similar form being if desired mounted across such groove in the head, so that the upper edge of the vessel coming into contact therewith will be turned in and over by the combined effects of the shape of the grooves in the head and rollers and the rotary and forward movements imparted to such head, and as the upper part of the vessel has been previously pasted, as described, the parts turned in will adhere to the sides. When the turning in or crimping has been effected to the desired extent the frame 146 is retracted, and the carrier 42 then moves forward again, but no further operations are performed at the thirteenth and fourteenth positions, thereby giving the pasted and turned in upper edge time to dry and set.

*Mechanism for rolling out upper edge.—* At the fifteenth position of the carrier the upper part of the vessel is rolled out to the desired configuration, which in the preferred form comprises a groove around the inner surface, into which a lid is to be fitted when in use, and a shoulder or projection around the outer surface by means of which jamming of the vessels is prevented when a number are nested together for convenience in storage and transport. For the purpose of carrying out this rolling operation a head 150 having its outer conical surface of the necessary configuration to impart the desired shape to the vessel by contact with the inner surface of the latter, is preferably employed, and is mounted in eccentric relation to a rotating spindle 151 to which motion is communicated by means of bevel gearing 152 and a chain and chain wheels 153. These parts are so arranged and supported on a lever 154 pivoted at 155 that when such lever is caused to advance by means of cam 156 acting on lever 157 pivoted to the casing of the rolling mechanism the head 150 will enter the turned in top of the vessel in pocket 41 and when in position therein will be caused to make contact with one side thereof, the continued operation, owing to its eccentric mounting, causing it to roll around the entire inner surface of the upper edge of the vessel and impart the desired form to the latter. The rolling apparatus is then withdrawn and the carrier 42 permitted to make its next movement. The spindle 151 of this rolling apparatus may be formed with a quick screw thread 151$^a$ with which a nut 151$^b$ engages, such nut not being capable of turning on the screw, but being able to move longitudinally in relation thereto, which longitudinal movement may be imparted to it by a lever 151$^c$ operated by a cam or in any other suitable manner at the proper times. This longitudinal movement of the nut in relation to the screw on spindle 151 will turn the latter and thereby move the operating head 150 carried on the eccentric end thereof into or out of contact with the side of the receptacle in pocket 41.

*Waxing inside of vessel.—* Nothing is done at the sixteenth position, but at the seventeenth means are provided for applying paraffin wax or like material to the entire inner surface of the vessel. The apparatus employed for this purpose is caused to advance to and recede from its operative position by cam 65 on shaft 16 through levers 66 and 160, and comprises a felt or like covered perforated cone 161 which when in its advanced position approximately fits the inside of the vessel, and when thus advanced cam 250 on shaft 23 operates pump 102 of the reservoir in which the boiling paraffin wax or like material is contained, so that such wax will be forced out through the perforations in the cone and the felt or other material covering the latter, thus forcing such wax into contact with the sides of the vessel. Any surplus will drain into the return pan 162 which connects with the reservoir by means of a pipe 164ª. The spindle 163 on which the perforated cone 161 is mounted preferably has a rotary motion imparted thereto, as by means of a chain 164 and chain wheels 165 and 166, the latter of which is mounted on shaft 167 receiving motion from shaft 63 through bevel gears 168 and 169.

*Delivery of completed vessels.*—When the wax or other material applied as described has been allowed to dry, which is effected during the movement of the carrier 42 from the seventeenth to the nineteenth position, the vessel is complete and ready for delivery from the carrier. The first step for this purpose takes place at the nineteenth position, where projection 270 of lever 17 comes in contact with the bottom of the vessel when such lever is actuated as hereinbefore described. The vessel is thus disengaged from the pocket, and its gravity will then cause it to slip down almost out of the pocket 41 into contact with the inclined portion of a delivery board 170, and it rests in this inclined position, as shown in Fig. 1, until the carrier makes its next movement toward the twentieth position, when the vessel will be caused to tilt forward until it rests in an upright but inverted position on the flat portion of delivery board 170, when one or other of its edges resting thereon is engaged by a pusher or other suitable means which may extend up through a slot in such board. The pusher conveys it to a suitable position at one side of the machine, from which it may be taken by hand, and a number being, if desired, nested together may be stored away ready for use.

After the pocket in which the vessel has been formed has delivered the completed article as described, the carrier 42 moves on through its twentieth and twenty-first positions, and finally arrives back at its starting point ready for a further operation.

It will be understood that each of the twenty-one pockets 41 on carrier 42 is supplied with a rolled blank as it arrives at the initial or starting position, so that when in operation each pocket is occupied by a vessel in process of formation, all the different steps in such formation hereinbefore described being carried out simultaneously on the blanks in the respective pockets, and as, as hereinbefore stated, the whole of the appliances for effecting the different operations are preferably duplicated on each side of carrier 42, it will be seen that when in full running order two completed vessels will be delivered at the completion of each step in the intermittent rotary movement imparted to such carrier.

I wish it to be understood that I do not desire to limit myself to any special form or arrangement of the various appliances for carrying out the different operations in the process of manufacture hereinbefore described, nor of the means by which such appliances are actuated or caused to assume their operative and non-operative positions and further it must be understood that although in most cases it will be found advisable to effect the whole of such different operations on the vessel, for certain purposes some thereof, as for instance the pasting of the bottom or top or both, and the waxing of the outside or inside or both, may be omitted, if desired.

What I claim as my invention and desire to secure by Letters Patent is:—

1. In a machine for the manufacture of paper vessels the combination of means for feeding in and rolling up the blank to form the sides of the vessel, means for turning in the bottom edge thereof, means for inserting the bottom piece and securing it in position by a rolling operation, means for turning in the upper edge of the vessel, means for rolling out such upper edge to the desired configuration, and means for delivering the completed vessels, substantially as specified.

2. In a machine for the manufacture of paper vessels the combination of a holder for the blanks to form the sides of the vessel, means for feeding in and rolling up the blanks, suction apparatus for taking such blanks one at a time from the holder and delivering them to the means for feeding in and rolling up the blank, means for turning in the bottom edge of the rolled up blank, means for inserting the bottom piece and securing it in position by a rolling operation, means for turning in the upper edge of the vessel, means for rolling out such upper edge to the desired configuration, and means for delivering the completed vessels, substantially as specified.

3. In a machine for the manufacture of paper vessels the combination of a holder for the blanks to form the sides of the vessel, a pasting board, means for taking such blanks one at a time from the holder and delivering them to the pasting board, means for applying adhesive to the surface of the blank, means for feeding in the pasted blank and rolling same up, means for turning in the bottom edge of the rolled blank, means for inserting the bottom piece and securing it in position by a rolling operation, means for turning in the upper edge of the vessel, means for rolling out such upper edge to the desired configuration, and means for delivering the completed vessels, substantially as specified.

4. In a machine for the manufacture of paper vessels the combination of means for feeding in and rolling up the blank to form the sides of the vessel, means for applying adhesive to the inner surface of the lower edge of the rolled blank, means for turning in such lower edge, means for inserting the bottom piece and securing it in position by a rolling operation, means for turning in the upper edge of the vessel, means for rolling out such upper edge to the desired configuration, and means for delivering the completed vessels, substantially as specified.

5. In a machine for the manufacture of paper vessels the combination of means for feeding in and rolling up the blank to form the sides of the vessel, means for turning in the bottom edge thereof, means for forming up the bottom piece to be inserted therein, means for inserting such bottom piece and securing it in position by a rolling operation, means for turning in the upper edge of the vessel, means for rolling out such upper edge to the desired configuration, and means for delivering the completed vessels, substantially as specified.

6. In a machine for the manufacture of paper vessels the combination of means for feeding in and rolling up the blank to form the sides of the vessel, means for turning in the bottom edge thereof, means for forming up the bottom piece to be inserted therein, means for conveying such bottom piece into the rolled up blank and for holding it in position therein, means for securing such bottom piece and for completing the formation of the bottom by a rolling operation, means for turning in the upper edge of the vessel, means for rolling out such upper edge to the desired configuration, and means for delivering the completed vessels, substantially as specified.

7. In a machine for the manufacture of paper vessels the combination of means for feeding in and rolling up the blank to form the sides of the vessel, means for turning in the bottom edge thereof, means for inserting the bottom piece and securing it in position by a rolling operation, means for treating the outer surface of the lower part of the vessel with sterilizing and waterproofing material such as paraffin wax, means for turning in the upper edge of the vessel, means for rolling out such upper edge to the desired configuration, and means for delivering the completed vessels, substantially as specified.

8. In a machine for the manufacture of paper vessels the combination of means for feeding in and rolling up the blank to form the sides of the vessel, means for turning in the bottom edge thereof, means for inserting the bottom piece and securing it in position by a rolling operation, means for applying adhesive to the inner surface of the upper edge of the vessel, means for turning in such upper edge, means for rolling out such upper edge to the desired configuration, and means for delivering the completed vessels, substantially as specified.

9. In a machine for the manufacture of paper vessels the combination of means for feeding in and rolling up the blank to form the sides of the vessel, means for turning in the bottom edge thereof, means for inserting the bottom piece and securing it in position by a rolling operation, means for turning in the upper edge of the vessel, means for rolling out such upper edge to the desired configuration, means for treating the inner surface of the vessel with sterilizing and waterproofing material such as paraffin wax, and means for delivering the completed vessels, substantially as specified.

10. In a machine for the manufacture of paper vessels the combination of a holder for the blanks to form the sides of the vessel; means for taking such blanks one at a time from the holder and delivering them to a pasting board, means for applying adhesive to the surface of the blank, means for feeding in the pasted blank and rolling same up, means for applying adhesive to the inner surface of the lower edge of the rolled blank, means for turning in such lower edge, means for forming, conveying, inserting and holding the bottom piece and for securing same and completing the formation of the bottom by a rolling operation, means for treating the outer surface of the lower part of the vessel with sterilizing and waterproofing material, means for applying adhesive to the inner surface of the upper edge of the vessel, means for turning in such upper edge, means for rolling out such upper edge to the desired configuration, means for treating the inner surface of the vessel with sterilizing and waterproofing material, and means for delivering the completed vessels, substantially as specified.

11. In a machine for the manufacture of paper vessels the combination of means for feeding in, applying adhesive to and rolling up the blanks to form the sides of the vessel, means for applying adhesive to the lower and upper edges of the inner surface of the rolled blank, means for turning in the lower edge and for subsequently inserting the bottom piece and for securing it in position by a rolling operation, means for turning in the upper edge and for subsequently rolling same out to the desired configuration, means for treating the outer and inner surfaces of the vessel with sterilizing and waterproofing material, and means for delivering the completed vessels, substantially as specified.

12. In a machine for the manufacture of paper vessels the combination of means for feeding in and rolling up the blank to form the sides of the vessel, means for turning in the bottom edge thereof, means for inserting the bottom piece and securing it in position by a rolling operation, means for turning in the upper edge of the vessel, means for rolling out such upper edge to the desired configuration, means for applying heat to the vessels in process of formation, and means for delivering the completed vessels, substantially as specified.

13. In a machine for the manufacture of paper vessels the combination of means for feeding the blank to form the sides of the vessel, means for applying adhesive to such blank, means for rolling up such blank, means for turning in the bottom edge of the rolled blank, means for inserting the bottom piece and securing it in position by a rolling operation, means for turning in the upper edge of the vessel, means for rolling out such upper edge to the desired configuration, means for applying heat to the vessels in process of formation, and means for delivering the completed vessels, substantially as specified.

14. In a machine for the manufacture of paper vessels the combination of means for feeding in and rolling up the blank to form the sides of the vessel, means for applying adhesive to the inner surface of the lower edge of the rolled blank, means for turning in such lower edge, means for inserting the bottom piece and securing it in position by a rolling operation, means for turning in the upper edge of the vessel, means for rolling out such upper edge to the desired configuration, means for applying heat to the vessels in process of formation, and means for delivering the completed vessels, substantially as specified.

15. In a machine for the manufacture of paper vessels the combination of means for feeding in and rolling up the blank to form the sides of the vessel, means for turning in the lower edge of the rolled blank, means for inserting the bottom piece and securing it in position by a rolling operation, means for applying adhesive to the inner surface of the upper edge of the vessel, means for turning in such upper edge, means for rolling out such upper edge to the desired configuration, means for applying heat to the vessels in process of formation, and means for delivering the completed vessels, substantially as specified.

16. In a machine for the manufacture of paper vessels the combination of means for feeding in and rolling up the blank to form the sides of the vessel, means for turning in the lower edge of the rolled blank, means for inserting the bottom piece and securing it in position by a rolling operation, means for treating the outer surface of the vessel with sterilizing and waterproofing material such as paraffin wax, means for turning in the upper edge of the vessel, means for rolling out such upper edge to the desired configuration, means for applying heat to the vessels in process of formation, and means for delivering the completed vessels, substantially as specified.

17. In a machine for the manufacture of paper vessels the combination of means for feeding in and rolling up the blank to form the sides of the vessel, for turning in the lower edge of the rolled blank, means for inserting the bottom piece and securing it in position by a rolling operation, means for turning in the upper edge of the vessel, means for rolling out such upper edge to the desired configuration, means for treating the inner surface of the vessel with sterilizing and waterproofing material such as paraffin wax, means for applying heat to the vessels in process of formation, and means for delivering the completed vessels, substantially as specified.

18. In a machine for the manufacture of paper vessels the combination of a holder for the blanks to form the sides of the vessel, a pasting board, means for taking such blanks one at a time from the holder and delivering them to the pasting board, means for applying adhesive to the surface of the blank, means for feeding in the pasted blank and rolling same up, means for applying adhesive to the inner surface of the lower edge of the vessel, means for turning in such lower edge, means for forming, conveying, inserting and holding the bottom piece and for securing same and completing the formation of the bottom by a rolling operation, means for treating the outer surface of the lower part of the vessel with sterilizing and waterproofing material, means for applying adhesive to the inner surface of the upper edge of the vessel, means for turning in such upper edge, means for rolling out such upper edge to the desired configuration, means for treating the inner surface of the vessel with sterilizing and waterproofing material, means for applying heat to the vessels in process of formation, and means for delivering the completed vessels, substantially as specified.

19. In a machine for the manufacture of paper vessels the combination of means for feeding in and rolling up the blank to form the sides of the vessel, means for turning in the bottom edge thereof, means for inserting the bottom piece and securing it in position by a rolling operation, means for turning in the upper edge of the vessel, means for rolling out such upper edge to the desired configuration, means for delivering the completed vessels, and a carrier for bringing into relative position the vessels in process of formation and the different mechanisms for operating thereon, substantially as specified.

20. In a machine for the manufacture of paper vessels the combination of means for feeding in and rolling up the blank to form the sides of the vessel, means for applying adhesive to the inner surface of the lower edge thereof, means for turning in such lower edge, means for inserting the bottom piece and securing it in position by a rolling operation, means for turning in the upper edge of the vessel, means for rolling out such upper edge to the desired configuration, means for delivering the completed vessels, and a carrier for bringing into relative position the vessels in process of formation and the different mechanisms for operating thereon, substantially as specified.

21. In a machine for the manufacture of paper vessels the combination of means for feeding in and rolling up the blank to form the sides of the vessel, means for turning in the lower edge of the rolled up blank, means for inserting the bottom piece and securing it in position by a rolling operation, means for applying adhesive to the inner surface of the upper edge of the vessel, means for turning in such upper edge, means for rolling out such upper edge to the desired configuration, means for delivering the completed vessels, and a carrier for bringing into relative position the vessels in process of formation and the different mechanisms for operating thereon, substantially as specified.

22. In a machine for the manufacture of paper vessels the combination of means for feeding in and rolling up the blank to form the sides of the vessel, means for turning in the lower edge of the rolled up blank, means for inserting the bottom piece and securing it in position by a rolling operation, means for treating the outer surface of the vessel with sterilizing and waterproofing material, means for turning in the upper edge of the vessel, means for rolling out such upper edge to the desired configuration, means for delivering the completed vessels, and a carrier for bringing into relative position the vessels in process of formation and the different mechanisms for operating thereon, substantially as specified.

23. In a machine for the manufacture of paper vessels the combination of means for feeding in and rolling up the blank to form the sides of the vessel, means for turning in the lower edge of the rolled up blank, means for inserting the bottom piece and securing it in position by a rolling operation, means for turning in the upper edge of the vessel, means for rolling out such upper edge to the desired configuration means for treating the inner surface of the vessel with sterilizing and waterproofing material, means for delivering the completed vessels, and a carrier for bringing into relative position the vessels in process of formation and the different mechanisms for operating thereon, substantially as specified.

24. In a machine for the manufacture of paper vessels the combination of means for feeding in, applying adhesive to, and rolling up the blanks to form the sides of the vessel, means for applying adhesive to the lower and upper edges of the inner surface of the rolled blank, means for turning in the lower edge and for subsequently securing it in position by a rolling operation, means for turning in the upper edge and for subsequently rolling same out to the desired configuration, means for treating the outer and inner surfaces of the vessel with sterilizing and waterproofing material such as paraffin wax, means for delivering the completed vessels, and a carrier for bringing into relative position the vessels in process of formation and the different mechanisms for operating thereon, substantially as specified.

25. In a machine for the manufacture of paper vessels the combination of means for feeding in and rolling up the blank to form the sides of the vessel, means for turning in the bottom edge thereof, means for inserting the bottom piece and securing it in position by a rolling operation, means for turning in the upper edge of the vessel, means for rolling out such upper edge to the desired configuration, means for delivering the completed vessels, a carrier for bringing into relative position the vessels in process of formation and the different mechanisms for operating thereon, and means for controlling the movement of the movable carrier, substantially as specified.

26. In a machine for the manufacture of paper vessels the combination of means for feeding in and rolling up the blank to form the sides of the vessel, means for applying adhesive to the inner surface of the lower edge thereof, means for turning in such lower edge, means for inserting the bottom piece and securing it in position by a rolling operation, means for turning in the upper edge of the vessel, means for rolling out such upper edge to the desired configuration, means for delivering the completed vessels, a carrier for bringing into relative position the vessels in process of formation and the different mechanisms for operating thereon and means for controlling the movement of the movable carrier, substantially as specified.

27. In a machine for the manufacture of paper vessels the combination of means for feeding in and rolling up the blank to form the sides of the vessel, means for turning in the lower edge of the rolled up blank, means for inserting the bottom piece and securing it in position by a rolling operation, means for applying adhesive to the inner surface of the upper edge of the vessel, means for turning in such upper edge, means for rolling out such upper edge to the desired configuration, means for delivering the completed vessels, a carrier for bringing into relative position the vessels in process of formation and the different mechanisms for operating thereon, and means for controlling the movement of the movable carrier, substantially as specified.

28. In a machine for the manufacture of paper vessels the combination of means for feeding in and rolling up the blank to form the sides of the vessel, means for turning in the lower edge of the rolled up blank, means for inserting the bottom piece and securing it in position by a rolling operation, means for treating the outer surface of the vessel with sterilizing and waterproofing material, means for turning in the upper edge of the vessel, means for rolling out such upper edge to the desired configuration, means for delivering the completed vessels, a carrier for bringing into relative position the vessels in process of formation and the different mechanisms for operating thereon, and means for controlling the movement of the movable carrier, substantially as specified.

29. In a machine for the manufacture of paper vessels the combination of means for feeding in and rolling up the blank to form the sides of the vessel, means for turning in the lower edge of the rolled up blank, means for inserting the bottom piece and securing it in position by a rolling operation, means for turning in the upper edge of the vessel, means for rolling out such upper edge to the desired configuration, means for treating the inner surface of the vessel with sterilizing and waterproofing material, means for delivering the completed vessels, a carrier for bringing into relative position the vessels in process of formation and the different mechanisms for operating thereon, and means for controlling the movement of the movable carrier, substantially as specified.

30. In a machine for the manufacture of paper vessels the combination of means for feeding in, applying adhesive to, and rolling up the blanks to form the sides of the vessel, means for applying adhesive to the lower and upper edges of the inner surface of the rolled blank, means for turning in the lower edge and for subsequently securing it in position by a rolling operation, means for turning in the upper edge and for subsequently rolling same out to the desired configuration, means for treating the outer and inner surfaces of the vessel with sterilizing and waterproofing material such as paraffin wax, means for delivering the completed vessels, a carrier for bringing into relative position the vessels in process of formation and the different mechanisms for operating thereon, and means for controlling the movement of the movable carrier, substantially as specified.

31. In a machine for the manufacture of paper vessels the combination of means for feeding in and rolling up the blank to form the sides of the vessel, means for turning in the bottom edge thereof, means for inserting the bottom piece and securing it in position by a rolling operation, means for turning in the upper edge of the vessel, means for rolling out such upper edge to the desired configuration, means for delivering the completed vessels, a carrier for bringing into relative position the vessels in process of formation and the different mechanisms for operating thereon, and means for applying heat to such vessels, substantially as and for the purpose specified.

In testimony whereof I affix my signature in presence of two witnesses.

ELMER ZEBLEY TAYLOR.

Witnesses:
H. D. JAMESON,
A. NUTTING.